United States Patent
Seck et al.

(10) Patent No.: US 12,234,584 B2
(45) Date of Patent: Feb. 25, 2025

(54) METHOD FOR MANUFACTURING INSULATION PRODUCTS BASED ON MINERAL WOOL USING A SOLID THERMOSETTING BINDER

(71) Applicant: SAINT-GOBAIN ISOVER, Courbevoie (FR)

(72) Inventors: Mamadou Seck, Creil (FR); Mickaël Delmée, Wavignies (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 170 days.

(21) Appl. No.: 17/913,536

(22) PCT Filed: Mar. 18, 2021

(86) PCT No.: PCT/FR2021/050457
§ 371 (c)(1),
(2) Date: Sep. 22, 2022

(87) PCT Pub. No.: WO2021/191533
PCT Pub. Date: Sep. 30, 2021

(65) Prior Publication Data
US 2023/0103871 A1    Apr. 6, 2023

(30) Foreign Application Priority Data

Mar. 24, 2020 (FR) ..................... 2002863

(51) Int. Cl.
| | | |
|---|---|---|
| D04H 1/60 | (2006.01) |
| C03C 25/002 | (2018.01) |
| C03C 25/005 | (2018.01) |
| C03C 25/146 | (2018.01) |
| C03C 25/32 | (2018.01) |
| D04H 1/4209 | (2012.01) |
| D04H 1/587 | (2012.01) |
| D06B 19/00 | (2006.01) |

(52) U.S. Cl.
CPC ............ *D04H 1/60* (2013.01); *C03C 25/002* (2013.01); *C03C 25/005* (2013.01); *C03C 25/146* (2013.01); *C03C 25/32* (2013.01); *D04H 1/4209* (2013.01); *D04H 1/587* (2013.01); *D06B 19/0035* (2013.01); *D10B 2401/063* (2013.01); *D10B 2505/00* (2013.01)

(58) Field of Classification Search
CPC ... C03C 25/002; C03C 25/005; C03C 25/146; C03C 25/26; C03C 25/32; C03C 25/34; C03C 25/36; D04H 1/4209; D04H 1/4218; D04H 1/587; D04H 1/60; D06B 1/02; D06B 19/0017; D06B 19/0035; D10B 2401/063; D10B 2505/00
See application file for complete search history.

(56) References Cited

U.S. PATENT DOCUMENTS

2017/0036955 A1* 2/2017 Obert ................ D06B 1/02

FOREIGN PATENT DOCUMENTS

| EP | 2602368 A1 | 6/2013 |
| FR | 2138284 A1 | 1/1973 |
| FR | 2603518 A1 | 3/1988 |
| WO | WO-2013014399 A1 | 1/2013 |
| WO | WO-2017036838 A1 | 3/2017 |

OTHER PUBLICATIONS

International Search Report issued Jul. 5, 2021 in PCT/FR2021/050457 (with English translation), 7 pages.

* cited by examiner

*Primary Examiner* — John J DeRusso
*Assistant Examiner* — Victoria Bartlett
(74) *Attorney, Agent, or Firm* — Element IP, PLC

(57) ABSTRACT

The present invention relates to a method for manufacturing insulation products based on mineral wool bound by an organic binder, comprising the following successive steps:
(a) providing a mineral wool,
(b) humidifying the mineral wool,
(c) placing the humidified mineral wool fibers in contact with particles of binder comprising a mixture of thermosetting reagents,
(d) shaping the mixture of mineral wool and binder particles, and
(e) heating the shaped mixture to a temperature and for a period sufficient to allow the condensation of the reagents and the formation of an insulation product based on mineral wool bound by an insoluble and infusible organic binder.

20 Claims, No Drawings

METHOD FOR MANUFACTURING INSULATION PRODUCTS BASED ON MINERAL WOOL USING A SOLID THERMOSETTING BINDER

The present invention relates to a method for manufacturing insulation products based on mineral wool bound by an organic binder, comprising fixing a water-soluble and thermosetting binder powder on previously humidified mineral wool fibers.

The manufacture of insulation products based on mineral wool generally comprises a step of manufacturing glass or rock fibers by a method for centrifugation of molten glass or molten rock (fiberizing). The newly formed fibers are carried by a stream of hot air to a conveyor belt which collects them (forming) and transports them through a curing oven. On the path between the centrifugation device (fiberizing) and the fiber collecting belt, an aqueous thermosetting binder composition is sprayed onto the fibers, which subsequently undergoes a thermosetting reaction at temperatures of about 200° C. in the curing oven.

The aqueous binder compositions are diluted aqueous solutions, with low viscosity, of monomer reagents, oligomer and/or polymer resins. They are sprayed onto the still-hot, newly formed mineral fibers by means of a spray ring located downstream of the centrifugation device, in the immediate vicinity of the latter.

When the fibers are collected and assembled as a mat (or loft) on the collecting belt, they are sticky and the binder composition film that surrounds the mineral fibers still contains water.

Only when the sized mineral wool mat enters the temperature-controlled curing oven is the evaporation of the water completed and the condensation reaction of the binder reagents begins.

An installation for manufacturing insulation products based on mineral wool bound by organic binders, which operates in the manner described above (spraying of binder composition onto the still-hot fibers, partial evaporation of water, formation of a mat of sticky fibers, curing of the mat of sticky fibers in the oven), necessarily comprises a system for washing the installations, in particular a system for washing the forming chamber and the collecting belt. Indeed, the high tack of the sized fibers, which are still wet, conveyed in a stream of hot air between the fiberizing device and the conveyor belt, leads to the soiling of the walls of the forming chamber, the conveyor belt and of the suction device below it.

The wash water is recycled in a closed circuit, filtered, neutralized and reused for the manufacture of binder solutions and for the washing of production equipment. The system for washing the production installations and the recycling of the wash water in a closed circuit represent an important fraction of the investment and operating costs of a production installation for insulation products based on bound mineral wool.

The present invention aims to propose a method for manufacturing insulation products based on mineral wool bound by an organic binder which does not comprise a step during which mineral fibers sized by a binder composition, partially dried and sticky, are conveyed by means of a stream of air between the fiberizing device and the zone for forming a mat.

In the method for manufacturing insulation products of the present invention, the binder is not applied to still-hot, newly formed mineral fibers, but to mineral fibers at room temperature (i.e. in thermal equilibrium with the surrounding environment).

The inventors filed a French patent application (FR2000151) on Jan. 9, 2020, which was not yet published at the time of filing of the present application, for a method comprising the application of an aqueous binder composition to mineral fibers at room temperature, drying the aqueous binder composition at a moderate temperature, then setting the reagents of the binder by thermal crosslinking.

The method of the present invention does not consist in applying an aqueous solution of a reactive, thermosetting binder to the mineral fibers to be bound, but in fixing solid particles of thermosetting reagents on the mineral fibers, also called hereinafter "binder particles". The solid particles of thermosetting reagents are in the form of a free-flowing powder, in other words the binder particles are not sticky and thus do not spontaneously adhere to the fibers. If the binder particles were simply mixed with mineral fibers, the particles would pass through the network of fibers and would gather, under the effect of gravity, in certain areas of the product.

The inventors thus found themselves faced with the difficulty of fixing these binder particles to the mineral fibers in order to obtain a regular distribution of the binder particles in the fiber/particle mixture with the aim of distributing the binder as evenly as possible in the final insulation product, ensuring uniform mechanical properties.

International applications WO2017/036838 and WO2017/08639 disclose a method for manufacturing mineral wool-based insulation products wherein carbohydrate-based binder particles are simply mixed with mineral wool fibers, the mixture then being heated under compression. The products obtained have high densities, of the order of 500 kg/m$^3$, and high binder levels, of the order of 10% by weight. The method described in these applications is, however, not applicable to insulation products of lower density, e.g. only a few tens of kg per cubic meter. In a low-density physical mixture of particles and fibers, the particles have a tendency, under the effect of gravitational force, to pass through the low-density network of mineral fibers and to gather in the lower layers of the mixture.

The means that the inventors have found to overcome this difficulty is simple, economical and effective, and moreover does not present any ecological and/or health problem for the factory staff. The inventors have, in fact, found that it was sufficient to slightly humidify the mineral fibers before bringing them into contact with the binder particles, so that the thin film of liquid, generally water or an aqueous liquid, deposited at the surface of the fibers retains the binder particles and prevents them from gathering in the lower areas of the mixture, even if the latter is of low density. It is simply necessary to ensure that the quantity of humidifying liquid is not too great in order to avoid the dissolution of the particles in the liquid film.

The present invention thus relates to a method for manufacturing insulation products based on mineral wool bound by an organic binder wherein binder particles are brought into contact with previously humidified mineral fibers, before heating the mixture obtained thereby at a temperature sufficient to cause the reagents of the binder to react and thereby form an insoluble and infusible binder.

The invention more particularly relates to a method for manufacturing insulation products based on mineral wool bound by an organic binder, comprising the following successive steps:

(a) providing a mineral wool,
(b) humidifying the mineral wool,
(c) placing the humidified mineral wool fibers in contact with particles of binder comprising a mixture of thermosetting reagents,
(d) shaping the mixture of mineral wool and binder particles, and
(e) heating the shaped mixture to a temperature and for a period sufficient to allow the condensation of the reagents and the formation of an insulation product based on mineral wool bound by an insoluble and infusible organic binder.

The mineral wool provided in step (a) is preferably virgin mineral wool, i.e. mineral wool consisting of glass or rock fibers obtained by a method of centrifugation of molten glass or molten rock, called fiberizing. Virgin mineral wool fibers have no organic binder on their surface.

The mineral wool provided in step (a) can also be recycled mineral wool, i.e. mineral wool whose fibers carry a thermoset organic binder on their surface.

Naturally, the mineral wool provided in step (a) can also be a mixture of virgin mineral wool and recycled mineral wool.

The mineral wool provided is generally at room temperature, i.e. in thermal equilibrium with its environment.

It is recommended to proceed, before the humidifying step, with a step of opening the flakes or clods of mineral wool. This opening step has the function of separating the fibers from each other, of individualizing them in order to make them more accessible to the binder particles applied in step (c). The opening step can be implemented, for example, by carding by means of an appropriate device known in the state of the art. In a particularly preferred embodiment of the method of the invention, a pneumatic means is used for the opening of the mineral fibers, for example a rapid stream of air, preferably circulating in a turbulence chamber. The inventors have in fact observed that the opening of the flakes of mineral wool fibers by the passing through a pneumatic turbulence chamber advantageously made it possible to disentangle the fibers while limiting their breakage as much as possible. The final insulation product thus contains longer fibers than those obtained after utilization of a mechanical disentangling means and its mechanical performance is thereby improved.

Step (b) of humidifying the mineral wool can, in principle, be implemented by any appropriate means making it possible to deposit a controlled quantity of water in the form of a thin film on the surface of the fibers. Thus, it is possible, for example, to expose the mineral wool to hot water vapor, this water vapor condensing on contact with the fibers at room temperature. It is also possible to envisage exposing the mineral wool to a water aerosol, for example a mist or an aqueous spray.

It is generally not recommended to immerse the mineral wool in water or in an aqueous solution or dispersion because this would deposit excessively high amounts of water on the fibers, likely to dissolve the binder particles.

It should be ensured that the humidified mineral wool comprises, when it is brought into contact with the binder particles, preferably from 0.2 to 1.5% by weight, more preferably from 0.3 to 1.2%, in particular from 0.4 to 1.0% by weight of water, these percentages being expressed relative to the dry mineral wool.

When reference is made in this application to humidifying mineral wool, it generally refers to the application of water without other additives. It is, however, possible to envisage the application of aqueous solutions or dispersions containing, for example, coupling agents, a dispersed oily phase (anti-dust agent) or even bactericidal agents, surfactants, dyes or other known additives.

It follows from the foregoing that the method of the present invention does not include a step aimed at reinforcing the mechanical bond between the mineral fibers by entangling of the mineral fibers; thus, the method according to the invention does not include a needling step before or after the humidifying step or even before or after the step of bringing the humidified fibers into contact with the binder particles.

Step (c) of bringing the humidified mineral fibers into contact with binder particles is advantageously carried out using a pneumatic mixer, preferably using a stream of compressed air passing through a turbulence chamber, into which are introduced, preferably continuously, the binder particles. Naturally, the stream of compressed air conveying the fibers and the particles during the mixing phase (step (c)) must be at a relatively low temperature, preferably less than or equal to ambient temperature, so as not to totally evaporate the humidifying water. The temperature of the air stream is advantageously comprised between 10 and 25° C., in particular between 15 and 20° C.

Other means of bringing the particles into contact with the mineral wool can be envisaged. Thus, it is possible, for example, to sprinkle a thin layer of mineral wool evenly humidified with a "rain" of particles, generated by a vibrating screen under which the layer of mineral wool passes. Alternatively, carding of the humidified mineral wool can be carried out under a vibrating screen through which a steady stream of binder particles passes.

These last two modes of applying the particles to the humidified mineral wool can, of course, be followed by a stirring step in a pneumatic turbulence chamber.

The inventors were surprised to find that, despite the simultaneous presence of fibers, water and water-soluble binder particles, the wet fibers on the surface of which particles are immobilized do not stick to each other and, in particular, do not soil the pneumatic turbulence chamber used for stirring, provided that the amount of water used to humidify the fibers is controlled.

Step (d) of shaping the mineral wool is preferably carried out by molding and/or compression. The mold used for molding the products must be made of a material capable of withstanding the temperature of the thermosetting step. It must also have a structure that allows the hot air from the curing oven to easily penetrate the molded product. The mold can for example consist of a box-shaped metal screen. The metal-screen box is preferably filled with a volume of loose thermosetting mineral wool that is greater than its capacity and is then closed by a metal-screen cover. The mineral wool is thus more or less compressed depending on the excess filling volume. This excess filling volume of the box by the thermosetting mineral wool is for example comprised between 10% and 150%, preferably between 15 and 100% and in particular between 20 and 80%.

When the method of the present invention is a continuous method, the shaping of the mineral wool can be carried out, for example, by compression by means of a roller located at the entrance to the curing oven on a conveyor, the compression ratio preferably being between 20 and 70%, in particular between 30 and 60%.

The step of setting the shaped mineral wool by heating it at a temperature for long enough to enable the constituents of the binder to be condensed (polymerization/crosslinking) and an insoluble binder to be formed is carried out under conditions that are familiar to a person skilled in the art.

When the method is a continuous method, the curing oven is advantageously identical to the oven of a line for manufacturing insulation products of the prior art, wherein very hot compressed air is passed through the mat of mineral wool.

The heating temperature of step (e) is advantageously comprised between 130° C. and 240° C., preferably between 180° C. and 230° C., in particular between 190° C. and 220° C. The heating time is advantageously comprised between 30 seconds and 15 minutes, preferably between 1 minute and 10 minutes, in particular between 2 and 8 minutes.

It is easy to adjust the density and the thickness of the insulation products based on mineral wool obtained by the method of the present invention by varying the compression rate of the thermosetting mineral wool during the curing step. The insulation products generally have a density comprised between 4 and 70 kg/m$^3$, preferably between 5 and 60 kg/m$^3$, in particular between 6 and 45 kg/m$^3$.

Their thickness is generally comprised between 20 mm and 500 mm, advantageously between 40 mm and 300 mm, preferably between 50 mm and 200 mm, and in particular between 60 mm and 150 mm.

They have a binder content, measured by the loss on ignition, comprised of between 3 and 9%, preferably between 4 and 8%, ideally between 4.5 and 7%.

The binders that can be used in the present invention include all mixtures of organic reagents, solid at room temperature, capable of reacting at high temperature to form a crosslinked, insoluble and infusible polymer system.

This definition excludes phenol formaldehyde resins (resoles) that are liquid at room temperature, but may include certain epoxy novolac resins that are solid at room temperature.

In an advantageous embodiment of the invention, the binder particles comprise at least 50% by weight, preferably at least 70% by weight, and ideally at least 90% by weight of bio-based reagents, renewable in the short term, i.e. not sourced from the oil industry.

These bio-based reagents are chosen in particular from saccharides, saccharide hydrogenation products and bio-based polycarboxylic acids, which are solid at room temperature.

They preferably comprise at least one sugar and/or hydrogenated sugar and citric acid.

The reaction between the saccharides and/or saccharide hydrogenation products and the polycarboxylic acid is advantageously catalyzed by a catalyst, particularly by sodium hypophosphite (SHP), also present in the binder particles.

Thermosetting binder systems for mineral wool based on reducing saccharides, non-reducing saccharides and/or hydrogenated sugars and polycarboxylic acids are disclosed in detail in international applications WO2009/080938, WO2010/029266, WO2013/014399, WO2013/021112 and WO2015/132518 in the name of the applicant.

The bio-based reagents comprise at least 70% by weight, preferably at least 80%, and ideally at least 90% by weight of hydrogenated sugars and citric acid.

The bio-based reagents can also be, for example, Maillard reaction reagents comprising, on the one hand, reducing sugars and, on the other hand, a nitrogen-containing or amine reagent, particularly an ammonium salt of a carboxylic acid, a mineral acid, such as sulfuric or phosphoric acid, or an organophosphonic or organosulphonic acid. Such binders are known, for example, from applications WO2007/014236, WO2009/019232 and WO2012/037451.

Advantageously, each binder particle contains all the organic reagents, bio-based or not, necessary for forming a crosslinked network of organic binder. In other words, it is preferable not to simply mix several powders each comprising a single type of reagent, for example a sugar powder with a citric acid powder and a sodium hypophosphite powder, but to use a powder where the different reagents and catalysts are intimately mixed, at the molecular level, within the same binder particle. Such a powder containing all of the reagents in each of the particles constituting it can be prepared, for example, by freeze-drying or by spray-drying an aqueous solution of the binder reagents and catalyst(s). Powders formed by spray-drying are preferred to those obtained by freeze-drying because the latter may dissolve too easily in the water film on the surface of the mineral wool fibers. Furthermore, on an industrial scale, spray-drying is considerably easier to carry out and less expensive.

EXAMPLE

A powder containing 45.7% by weight of maltitol, 49.5% of citric acid and 4.76% of sodium hypophosphite is prepared by spray-drying an aqueous solution. The resulting binder powder is non-cloying and free-flowing.

Flakes of glass fibers recovered from the shaping stage of a production method for blowing mineral wool are subjected to an opening (disentangling) stage for 5 minutes in a pneumatic turbulence chamber at the laboratory scale.

The humidification of the mineral wool thus disentangled is carried out by injecting hot water vapor (100° C.) by means of a steam cleaner (Hoover SCD 1600) into the turbulence chamber used for the disentangling. At the laboratory scale, the inventors used a plastic water bucket with a hole on the side (steam injection orifice) and closed by a screen.

It is checked by weighing, before and after humidifying, that the quantity of water fixed on the mineral fibers is comprised between 0.2 and 1.5%.

Then 80 g of humidified mineral fibers are added to 4 g of the binder powder, followed by mixing for 5 minutes in a turbulence chamber operating with dry compressed air at room temperature.

Slightly humid mineral wool fibers having particles of binder powder on their surface are thus obtained. Verification by optical microscopy (Keyence VHZ 2000) shows that the binder particles are visible. They are not dissolved in the water film.

The mineral wool is then introduced into a metal-screen box and slightly compressed. The whole is baked for 15 minutes in a hot air oven temperature-controlled at 215° C.

The mineral wool insulation product has a density of 28 kg/m$^3$, a binder content (loss on ignition) of 5.4%. It has an equal compressive strength of 3.7±0.72 kPa (at 10% strain).

The invention claimed is:

1. A method for manufacturing an insulation product comprising mineral wool bound by an organic binder, comprising the following successive steps:
    (a) humidifying a mineral wool to provide a humidified mineral wool that comprises from 0.2 to 1.5% by weight of water;
    (b) placing the humidified mineral wool that comprises from 0.2 to 1.5% by weight of water in contact with particles of binder comprising a mixture of thermosetting reagents to provide a mixture of mineral wool and binder particles;
    (c) shaping the mixture of mineral wool and binder particles to provide a shaped mixture; and (d) heating the shaped mixture to a temperature and for a period sufficient to allow condensation of the reagents and the formation of the insulation product comprising mineral wool bound by the organic binder.

2. The method according to claim 1, wherein the mineral wool is virgin mineral wool, a recycled mineral wool, or a blend of virgin mineral wool and recycled mineral wool.

3. The method according to claim 1 wherein the insulation product obtained in step (d) has a density comprised between 4 and 70 kg/m$^3$.

4. The method according to claim 1, wherein the insulation product obtained in step (d) has a binder content, determined by loss on ignition, comprised between 3 and 9.

5. The method according to claim 1, further comprising, before step (a):
opening the fibers.

6. The method according to claim 5, wherein the opening of the fibers is performed by carding or by passing mineral wool through a turbulence chamber.

7. The method according to claim 1, wherein the humidifying of the mineral wool is carried out by exposing the mineral wool to water vapor or to an aerosol of water.

8. The method according to claim 1, wherein the humidified mineral wool comprises, when it is brought into contact with the binder particles, from 0.4 to 1.0% by weight of water.

9. The method according to claim 1, wherein the bringing of the humidified mineral fibers into contact with binder particles is carried out using a pneumatic mixer.

10. The method according to claim 9, wherein the pneumatic mixer employs a stream of compressed air passing through a turbulence chamber.

11. The method according to claim 1, wherein the binder particles comprise at least 50% by weight of bio-based reagents.

12. The method according to claim 11, wherein the bio-based reagents are at least one selected from the group consisting of saccharides, saccharide hydrogenation products, and bio-based polycarboxylic acids.

13. The method according to claim 11, wherein the bio-based reagents comprise:
at least one sugar and/or hydrogenated sugar; and
citric acid.

14. The method according to claim 13, wherein the bio-based reagents comprise at least 70% by weight of hydrogenated sugars and citric acid.

15. The method according to claim 1, wherein the shaping of the mineral wool is carried out by molding and/or compressing the mineral wool.

16. The method according to claim 1, wherein the temperature of step (d) is comprised between 130° C. and 240° C.

17. The method according to claim 1, wherein the method does not include a step aimed at reinforcing a mechanical bond between the mineral fibers by entangling the mineral fibers.

18. The method according to claim 1, wherein the insulation product obtained in step (d) has a density comprised between 5 and 60 kg/m$^3$.

19. The method according to claim 1, wherein the insulation product obtained in step (d) has a binder content, determined by loss on ignition, comprised between 4 and 8%.

20. The method according to claim 1, wherein the humidified mineral wool comprises, when it is brought into contact with the binder particles, from 0.3 to 1.2% by weight of water.

* * * * *